United States Patent [19]
Zibilich et al.

[11] Patent Number: 5,290,989
[45] Date of Patent: Mar. 1, 1994

[54] WELD ROOT SHIELD DEVICE AND METHOD

[75] Inventors: Raymond A. Zibilich, Littleton; Robert A. Golla, Castle Rock, both of Colo.

[73] Assignee: The United States of America as represented by the Secretary of the Air Force, Washington, D.C.

[21] Appl. No.: 21,147

[22] Filed: Feb. 23, 1993

[51] Int. Cl.$^5$ .............................................. B23K 9/16
[52] U.S. Cl. ...................................... 219/74; 228/219
[58] Field of Search ............................ 219/72, 74, 75; 228/219

[56] References Cited

U.S. PATENT DOCUMENTS

| | | | |
|---|---|---|---|
| 2,644,070 | 6/1953 | Herbst | 219/74 |
| 2,856,510 | 10/1958 | Jones et al. | 219/74 |
| 2,918,563 | 12/1959 | Ternisien et al. | 219/74 |
| 3,210,518 | 10/1965 | Morley et al. | 219/121 |
| 3,450,857 | 6/1969 | Webb | 219/74 |
| 3,578,939 | 5/1971 | Green | 219/74 |
| 4,342,900 | 8/1982 | Susei et al. | 219/121 EN |
| 4,396,820 | 8/1983 | Puschner | 219/121 ED |
| 4,513,194 | 4/1985 | Mastromatteo | 219/121 EC |
| 4,658,110 | 4/1987 | Miller et al. | 219/121 LC |
| 4,866,236 | 9/1989 | DeNale et al. | 219/74 |

FOREIGN PATENT DOCUMENTS

| | | | |
|---|---|---|---|
| 213233 | 5/1968 | U.S.S.R. | 219/72 |
| 1323318 | 7/1987 | U.S.S.R. | 228/219 |

*Primary Examiner*—Clifford C. Shaw
*Attorney, Agent, or Firm*—Donald J. Singer; Robert L. Nathans

[57] ABSTRACT

A weld root shield device includes an inert gas supply tube having an open end together with a toroidal inert gas supply chamber having orifices therein surrounding the open end of the gas supply tube for replacing air that could be aspirated by inert gas emerging from the open end of the gas supply tube with inert gas emerging from the orifices of the toroidal supply chamber. The shield device is positioned over the weld root being produced by operation of the welding torch, thereby to protect the weld root from oxidation by the atmosphere. The welding torch and the weld root shield device can travel together as an elongated weld is being formed.

7 Claims, 1 Drawing Sheet

5,290,989

WELD ROOT SHIELD DEVICE AND METHOD

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of welding.

Weld root shielding is typically carried out by providing an inert gas to prevent oxidation of reactive materials such as aluminum and lithium being arc welded. Such oxidation is easily produced by oxygen bearing atmospheres. Full encapsulation inert gas delivery systems and more elaborate schemes are in use to provide an inert gas environment to protect the weld root. Other systems either contact the workpiece, or are large, obtrusive, or completely encapsulate the parts being welded. In most instance it is not desirable to contact the material near the weld joint. Large systems require substantial quantities of inert gas and interfere with fixtures and the manipulation of the workpiece, and encapsulation is typically elaborate and expensive.

Thus, there is a need for a method employing a simple device which is small, does not contact the workpiece and delivers modest amounts of inert gas where needed to shield the weld root from oxygen in the air.

BRIEF SUMMARY OF THE INVENTION

The aforesaid goals and objects of the invention can be attained by providing a weld root shield device comprising an inert gas supply tube having an open end together with a toroidal inert gas supply chamber having orifices therein surrounding the open end of the gas supply tube for replacing air that could be aspirated by inert gas emerging from the open end of the gas supply tube with inert gas emerging from the orifices of the toroidal supply chamber, and positioning a welding torch adjacent a first side of a weldment and positioning the weld root shield device adjacent a second side of the weldment opposite the first side in noncontacting relation thereto, operating the welding torch to produce a reactive metal weld root on the second side of the weldment while directing an inert gas through the gas supply tube and the toroidal inert gas chamber of the weld root shield device and over the weld root being produced by operation of the welding torch, thereby to protect the weld root from oxidation by the atmosphere. The welding torch and the weld root shield device can travel together as an elongated weld is being formed.

BRIEF DESCRIPTION OF THE DRAWINGS

Other objects features and advantages of the present invention will become apparent upon reading of the following description taken in conjunction with the drawings in which.

DETAILED DESCRIPTION OF PREFERRED EMBODIMENTS OF THE INVENTION

Figures 1, 2:
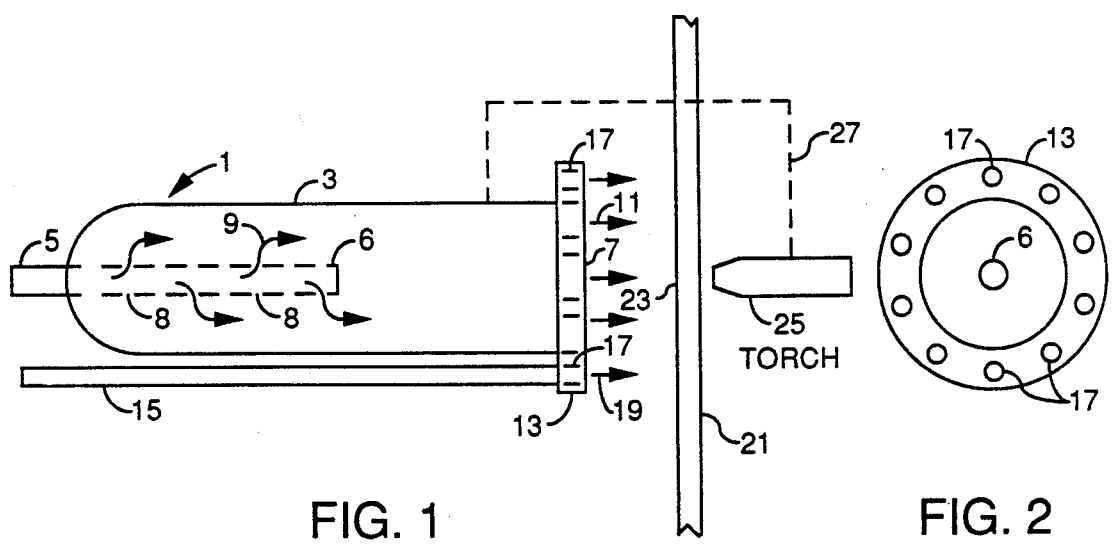
FIG. 1 illustrates the preferred weld root shield device positioned on one side of the workpiece being welded and aligned with a welding torch positioned on the opposite side of the workpiece.
FIG. 2 illustrates an end view of the weld root shield device of FIG. 1.

As illustrated in FIG. 1, weld root shield device 1 comprises an elongated gas supply tube 3 having a length of about nine inches and an open end portion 7. An inert gas is fed from inlet tube 5, through diffuser tube 67 via orifices 8. The passage of gas is indicated by arrows 9 and the result is a more uniform distribution of gas within the gas supply tube 3 and at the exit end portion 7. The aforesaid structure could produce aspiration of air into the output gas stream 11 surrounding weld root portion 23 of workpiece 21, such weld root being produced by welding torch 25, positioned on the side of the workpiece opposite the side of the workpiece facing the weld root shield device 1.

This problem is alleviated by providing a toroidal gas supply chamber 13 positioned at the exit portion of supply tube 3 as shown. This toroidal or halo-like supply chamber 13 has orifices 17 evenly positioned about the supply chamber to cause the inert gas at 19 to surround the moving body of gas 11 directed at the workpiece by supply tube 3. Thus, aspiration of detrimental air is blocked by the inert gas fed through the toroidal gas supply chamber. The inert gas is fed into the shield device by inlet tubes 5 and 15 as shown.

For many applications, the weld root shield device will be mechanically coupled to the welding torch 25 via a mechanical coupling device, schematically indicated by dashed link line 27. The result is that the torch and shield remain in alignment with each other and travel together during the production of the elongated weld.

Since variations in the above description will readily occur to the skilled worker in the art, the scope of the invention is to be defined by the terms of the following claims and art recognized equivalents thereof.

We claim:

1. A method of weld root shielding by directing inert gas at a reactive metal weld root without contacting the weld root and without the need to position the weld root in a gas chamber comprising the steps of:
 (a) providing a weld root shield device comprising a first inert gas supply means having an open end portion together with a second inert gas supply means surrounding the open end portion of the first inert gas supply means for replacing air that could be aspirated by inert gas emerging from the open end portion of the first gas supply means with inert gas emerging from the second gas supply means;
 (b) positioning a welding torch adjacent a first side of a weldment and positioning said weld root shield device adjacent a second side of the weldment opposite the first side in noncontacting relation thereto;
 (c) operating the welding torch to produce a reactive metal weld root on the second side of the weldment; and
 (d) directing an inert gas through the first and second inert gas supply means of the weld root shield device and over the weld root being produced by operation of the welding torch, thereby to protect the weld root from oxidation by the atmosphere.

2. The method of claim 1 including the step of causing the welding torch and the weld root shield device to travel together as an elongated weld is being formed while being maintained in alignment.

3. A method of weld root shielding by directing inert gas at a reactive metal weld root without contacting the weld root and without the need to position the weld root in a gas chamber comprising the steps of:

(a) providing a weld root shield device comprising an inert gas supply tube having an open end together with a toroidal inert gas supply chamber having orifices therein surround the open end of the gas supply tube for replacing air that could be aspirated by inert gas emerging from the open wend of the gas supply tube with inert gas emerging from the orifices of the toroidal inert gas tube;

(b) positioning a welding torch adjacent a first side of a weldment and positioning said weld root shield device adjacent a second side of the weldment opposite the first side in noncontacting relation thereto;

(c) operating the welding torch to produce a reactive metal weld root on the second side of the weldment;

(d) directing an inert gas through the gas supply tube and the toroidal inert gas chamber of the weld root shield device and over the weld root being produced by operation of the welding torch, thereby to protect the weld root from oxidation by the atmosphere.

4. The method of claim 3 including the step of causing the welding torch and the weld root shield device to travel together as an elongated weld is being formed while being maintained in alignment with respect to each other.

5. A weld root shield device for directing inert gas at a reactive metal weld root without contacting the weld root and without the need to position the weld root in a gas chamber, comprising an inert gas supply tube having an open end together with a toroidal inert gas supply chamber having orifices therein surrounding the open end of the gas supply tube for replacing air that could be aspirated by inert gas emerging from the open end of the gas supply tube with inert gas emerging from the orifices of the toroidal inert gas tube.

6. The weld root shield device of claim 5 further including a gas diffuser tube positioned internally of the inert gas supply tube for introducing inert gas into the supply tube and evenly distributing the inert gas within the inert gas supply tube.

7. The weld root shield device of claim 6 wherein said gas diffuser tube has a plurality of gas conducting orifices along the length thereof for diffusing gas within the inert gas supply tube.

* * * * *